(12) United States Patent
Shirk et al.

(10) Patent No.: US 7,090,523 B2
(45) Date of Patent: Aug. 15, 2006

(54) RELEASE MECHANISM FOR TRANSCEIVER MODULE ASSEMBLY

(75) Inventors: Michael Eugene Shirk, Grantville, PA (US); Keith McQuilkin Murr, Etters, PA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 10/752,325

(22) Filed: Jan. 6, 2004

(65) Prior Publication Data

US 2005/0148223 A1 Jul. 7, 2005

(51) Int. Cl.
*H01R 13/627* (2006.01)
(52) U.S. Cl. ..................................... 439/352
(58) Field of Classification Search ........ 439/352–358, 439/484, 160
See application file for complete search history.

(56) References Cited

U.S. PATENT DOCUMENTS

| | | | |
|---|---|---|---|
| 4,414,605 A | 11/1983 | Chino et al. | |
| 4,597,173 A | 7/1986 | Chino et al. | |
| 5,316,495 A | 5/1994 | Frantz | |
| 5,647,758 A | 7/1997 | Ichikawa et al. | |
| 5,793,614 A | 8/1998 | Tollbom | |
| 5,901,263 A | 5/1999 | Gaio et al. | |
| 6,364,709 B1 | 4/2002 | Jones | |
| 6,368,153 B1 | 4/2002 | Hwang | |
| 6,416,361 B1 | 7/2002 | Hwang | |
| 6,419,523 B1 | 7/2002 | Jones et al. | |
| 6,430,053 B1 | 8/2002 | Peterson et al. | |
| 6,434,015 B1 | 8/2002 | Hwang | |
| 6,443,768 B1 | 9/2002 | Dirkers et al. | |
| 6,478,622 B1 | 11/2002 | Hwang | |
| 6,749,448 B1 * | 6/2004 | Bright et al. | 439/160 |
| 6,824,416 B1 * | 11/2004 | Di Mascio | 439/352 |
| 6,851,867 B1 * | 2/2005 | Pang et al. | 385/88 |

FOREIGN PATENT DOCUMENTS

EP 0249406 A1 12/1987
GB 2042827 A 9/1980

* cited by examiner

*Primary Examiner*—Javaid H. Nasri

(57) ABSTRACT

An electrical module assembly configured for latching engagement with a receptacle assembly adapted for mounting to a printed circuit board includes a release mechanism having at least one actuator arm adapted to extend longitudinally along a respective one of opposite side walls of the receptacle assembly, and the actuator arm includes an ejector tab extending longitudinally therewith. A pivotally mounted bail is selectively positonable between a latched position and an unlatched position, and the bail engages the actuator arm and longitudinally pulls the actuator arm to release the ejector tab from the receptacle assembly.

17 Claims, 14 Drawing Sheets

RELEASE MECHANISM FOR TRANSCEIVER MODULE ASSEMBLY

CROSS REFERENCE TO RELATED APPLICATIONS

This application is related to U.S. application Ser. No. 10/382,214 filed Mar. 5, 2003, titled "Transceiver Module Assembly Ejector Mechanism", now U.S. Pat. No. 6,749, 448, the complete disclosure of which is hereby incorporated by reference in its entirety.

BACKGROUND OF THE INVENTION

The invention relates generally to an electronic transceiver assembly, and more particularly, to a receptacle which is mounted on a circuit board and a transceiver module pluggable into the receptacle.

Various types of fiber optic and copper based transceivers that permit communication between electronic host equipment and external devices are known. These transceivers may be incorporated into modules that can be pluggably connected to the host equipment to provide flexibility in system configuration. The modules are constructed according to various standards for size and compatibility, one standard being the Small Form-factor Pluggable (SFP) module standard.

The SFP module is plugged into a receptacle that is mounted on a circuit board within the host equipment. The receptacle includes an elongated guide frame, or cage, having a front that is open to an interior space, and an electrical connector disposed at a rear of the cage within the interior space. Both the connector and the guide frame are electrically and mechanically connected to the circuit board, and when an SFP module is plugged into a receptacle it is electrically and mechanically connected to the circuit board as well. Conventional SFP modules and receptacles perform satisfactorily carrying data signals at rates up to 2.5 gigabits per second (Gbps).

A standard currently in development for a next generation of SFP modules, presently being called the XFP standard, calls for the transceiver modules to carry data signals at rates up to 10 Gbps. Transmission of date signals at such a high rate raises problems not experienced previously in SFP modules. For, example, the XFP transceiver modules and the surrounding circuitry generate significantly greater quantities of heat to be removed in order for the electronic components to survive long term. Another problem is that the transceiver modules generate increased quantities of electro-magnetic (EM) energy at very short wavelengths. As the EM energy at the short wavelengths increases, the potential exists for more EM energy to pass through gaps in the shielding of the receptacle or guide frame. As more EM energy is accepted through the receptacle, the data signals conveyed by adjacent transceiver modules experience more EM interference (EMI). To overcome these problems, XFP transceiver modules are designed and constructed differently from conventional SFP transceiver modules in a number of aspects.

Conventional latch mechanisms are inadequate for use with the newly designed XFP modules, and a new latch mechanism was needed to secure the transceiver module in the receptacle and guide frame and to eject the transceiver module from the receptacle and guide frame. One known latch mechanism for the XFP modules includes a spring loaded ejector mechanism including actuator arms extending longitudinally along the opposite side walls of the receptacle. Bias springs extend longitudinally with and in contact with each of said actuator arms, and the actuator arms include a foot portion extending substantially perpendicular to a longitudinal axis of each arm. A pivotally mounted bail is mounted to the module in contact with the foot portion of the actuator arms. Rotation of the bail compresses the bias springs and releases the arms so that the bias elements eject the module from the receptacle.

It has been found, however, that the internal bias springs of the ejector mechanism can be difficult to use. Further, the internal springs tend to complicate the design of the module and increase manufacturing and assembly costs. Also, the bias springs may wear out after repeated use and fail to properly eject the module from the receptacle. It would be desirable to provide a simpler latch and release mechanism that is reliable, secure and robust for XFP modules.

BRIEF DESCRIPTION OF THE INVENTION

According to an exemplary embodiment, an electrical module assembly configured for latching engagement with a receptacle assembly adapted for mounting to a printed circuit board is provided. The electrical module assembly comprises a release mechanism comprising at least one actuator arm adapted to extend longitudinally along a respective one of opposite side walls of the receptacle assembly, and the actuator arm comprising an ejector tab extending longitudinally therewith. A pivotally mounted bail is selectively positonable between a latched position and an unlatched position, and the bail engages the actuator arm and longitudinally pulls the actuator arm to release the ejector tab from the receptacle assembly.

According to another exemplary embodiment, an electrical module assembly configured for latching engagement with a receptacle assembly adapted for mounting to a printed circuit board is provided. The electrical module assembly comprises first and second side walls. Each of the first and second side walls including a retention cavity, and each of the first and second side walls is configured for slidable insertion into a guide frame of the receptacle assembly. A release mechanism comprising first and second actuator arms adapted to extend longitudinally adjacent a respective one of opposite side walls of the guide frame is provided. Each of the arms comprises an ejector tab extending longitudinally therewith and configured to deflect a latch tab formed in each of the side walls of the guide frame. A pivotally mounted bail is coupled to the module assembly, and the bail configured to engage the actuator arms and displace the actuator arms along a longitudinal axis of the module assembly when the actuator is moved from a latched position to an unlatched position. The pivotally mounted bail positions both actuator arms simultaneously. The bail is disengaged from the actuator arms when the bail is in the latched position.

According to yet another exemplary embodiment, an electrical module assembly is provided. The assembly comprises a receptacle assembly comprising a guide frame having a top wall, a bottom wall and opposite side walls, with each of the side walls comprising a latch tab therein. A transceiver module assembly is configured for insertion into the guide frame, and the transceiver module assembly comprises opposite side surfaces extending adjacent the side walls of the guide frame when the module assembly is inserted into the guide frame. Each of the side surfaces of the module assembly comprises a retention cavity for engagement with a respective one of the latch tabs of the receptacle assembly. A release mechanism is provided comprising first and second substantially parallel actuator arms adapted for sliding engagement with the retention cavities of the module assembly. The actuator arms are positionable longitudinally adjacent a respective one of side walls of the guide frame, and each of the arms comprises an ejector tab extending longitudinally therewith and configured to deflect a respective one of the latch tabs of the guide frame. A pivotally mounted bail is coupled to the module assembly and configured to engage the actuator arms to unlatch the module assembly from the guide frame. The bail and the actuator arms are configured to position the ejector tabs relative to the latch tabs to manually release the module assembly from the guide frame without the use of bias elements.

DETAILED DESCRIPTION OF THE INVENTION

Figures 1, 2:
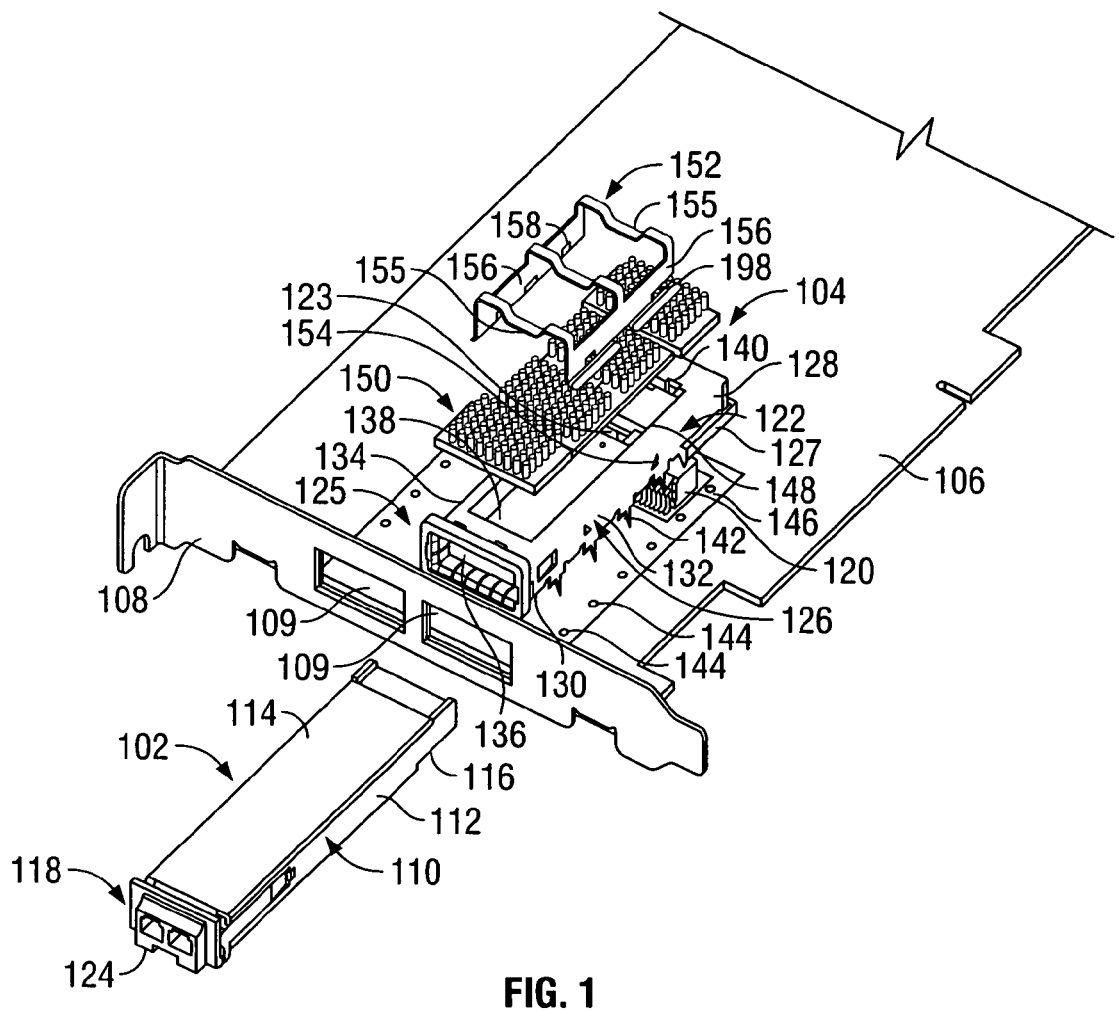
FIG. 1 is an exploded perspective view of a known module assembly and a receptacle assembly.
FIG. 2 is an assembled perspective view of a portion of the assembly shown in FIG. 1, showing the module assembly in a latched position within the receptacle assembly.

FIG. 1 illustrates a known module assembly and receptacle assembly 100 in which exemplary embodiments of the invention may be employed. The assembly 100 is adapted to address, among other things, heat dissipation and electromagnetic shielding for components conveying data signals at high rates, such as data transmission rates of 10 gigabits per second (Gbs) required of the XFP standard. It is appreciated, however, that the benefits and advantages of the invention may accrue equally to other data transmission rates and across a variety of systems and standards. Therefore, while the invention is described and illustrated in the context of assembly 100, the invention is not intended to be limited to assembly 100, and assembly 100 is therefore provided for purposes of illustration rather than limitation.

As shown in FIG. 1, the assembly 100 generally includes a module assembly 102 configured for pluggable insertion into a receptacle assembly 104 that is mounted to a host circuit board 106, which, in turn, is mounted in a host system such as a router or computer (not shown). The host system typically includes a conductive chassis having a bezel 108 including openings 109 therethrough in substantial alignment with a respective receptacle assembly 104. The module assembly 102 is inserted into the receptacle assembly 104 through the bezel opening 109, and the receptacle assembly 104 is electrically connected to the bezel 108.

In an illustrative embodiment, the module assembly 102 includes a housing 110 including a base 112 and a cover 114 that are secured together to form a protective shell for a circuit board (not shown in FIG. 1) that is disposed within the housing 110. The circuit board carries electronic circuitry and devices that perform transceiver functions in a known manner. An edge of the circuit board is exposed through a rear 116 of the housing 110, and the circuit board edge is pluggable into the receptacle assembly 104 as described below. The module assembly 102 is adapted for installation into the receptacle assembly 104 such that a front end 118 of the module assembly 102 is extended therefrom.

The module assembly 102 is configured to be inserted into the receptacle assembly 104. In general, the module assembly 102 and receptacle assembly 104 may be used in any application requiring an interface between a host system and electrical or optical signals. The module assembly 102 interfaces to the host system through the receptacle assembly 104 via a receptacle connector 120 which is located within a receptacle guide frame 122, also referred to as a cage. The module assembly 102 interfaces to an optical fiber or electrical cable (not shown in FIG. 1) through a connector interface 124 at a front end 118 of the module assembly 102. Preferably, the connector interface 124 comprises a mechanism that cooperates with a fiber or cable assembly (not shown) to secure the fiber or cable assembly to the module assembly 102. Suitable connector interfaces 124 are known and include adapters for the LC style connectors and the HSSDC2 copper connectors offered by Tyco Electronics Corporation (Harrisburg, Pa.).

The module assembly 102 and the receptacle assembly 104 reduce EMI emission through one or more of several EMI reduction features, including guide frame 122, a gasket assembly 125 coupled to a forward end of the guide frame 122 that interfaces with the bezel 108, and intermediate and rear gasket assemblies 123 and 127. The EMI reduction features are described in detail in U.S. application Ser. No. 10/382,214 filed Mar. 5, 2003, titled "Transceiver Module Assembly Ejector Mechanism", the complete disclosure of which is hereby incorporated by reference in its entirety.

As illustrated in FIG. 1, the guide frame 122 includes a stamped and formed metal body 126 that defines a shell having a top wall 128, a bottom wall 130, and side walls 132, 134. Front edges of each of the top, bottom and side walls 128–134 are formed as flanges which surround a front opening 136 into the guide frame 122. The top wall 128, the bottom wall 130, and the side walls 132, 134 define a cavity 138 therebetween for receiving the module assembly 102 through an opening 136 in the front end of the guide frame 122. The bottom wall 130 has a bottom opening to receive the receptacle connector 120. The guide frame 122 has a positive stop 140, which engages a surface of the module assembly 102 to prevent the module assembly 102 from passing too far rearwardly through the guide frame 122. When the module assembly 102 is inserted into the receptacle assembly 104, the guide frame 122 provides conductive walls on all sides thereof. Bottom wall 130 of guide frame 122 includes compliant pin leads 142 that are received within through-holes 144 of the host board 106 and provide a conductive path to ground of an equipment chassis when the receptacle assembly 104 is mounted therein. The host board 106 includes a conductive surface 146 provided thereon and formed as a sheet to underlie the receptacle assembly 104 to enhance the electromagnetic interference shielding.

The receptacle connector 120 is mounted on the circuit board 106 of the host equipment along with the guide frame 122, but separated from the conductive surface 146 of the host board 106. The receptacle connector 120 may be, for example, that which is sold under part number 788862-1 by Tyco Electronics Corporation. The receptacle connector 120 includes a slot that receives an edge of the circuit board that is carried by the module assembly 102 when the module assembly 102 is fully installed in the guide frame 122, thereby electrically connecting the module assembly 102 to the host equipment.

The top wall 128 of the guide frame 122 has a large opening 148 overlying the cavity 138 that accommodates an optional heat sink 150. The heat sink 150 is positioned to make physical contact with the module assembly 102 when the module assembly 102 is installed into the receptacle assembly 104. A clip 152 is mounted over the heat sink 150 and is secured to the guide frame 122. The clip 152 ensures that the heat sink 150 is loaded against the module assembly 102 to facilitate thermal transfer from the module assembly 102 to the heat sink 150. The heat sink 150 includes an engagement surface that faces and is located proximate the interior cavity 138 of the guide frame 122. The engagement surface of the heat sink 150 is configured to physically contact and abut against the module assembly 102 when installed in the interior cavity 138.

A retention tab 154 is formed on each of the side walls 132, 134 of the guide frame 122. The retention tabs 154 engage the clip 152 which, in turn, retains the heat sink 150 on the guide frame 122. The clip 152 securely engages the guide frame 122 to retain the heat sink 150 upon the guide frame 122. The clip 152 includes resilient spring members 155 secured over the heat sink 150. The spring members 155 flex to permit the heat sink 150 to move outward away from the guide frame 122 when the module assembly 102 is installed. The spring members 155 exert a desired force against the heat sink 150 to maintain a desired abutting interface to facilitate thermal transfer and heat dissipation from the module assembly 102. The clip 152 further includes side rails 156 that snap over the side walls 132, 134 of the guide frame 122. The side rails 156 are joined to one another by spring members 155 that extend over, and flexibly engage, the heat sink 150.

The heat sink construction and operation thereof is more completely described in U.S. application Ser. No. 10/382,214 filed Mar. 5, 2003, titled "Transceiver Module Assembly Ejector Mechanism", the complete disclosure of which is hereby incorporated by reference in its entirety.

FIG. 2 is a perspective view of receptacle assembly 104 mounted to the host board 106 and receiving the module assembly 102, with the heat sink 150 and the clip 152 removed for clarity. Also, the bezel 108 is not shown in FIG. 2.

The module assembly 102 is illustrated in a latched position wherein removal from the guide frame 122 is prevented. An axial pull on the front end 118 of the module assembly 102 in the direction of arrow A, when latched, is ineffective to remove the module assembly 102. In the latched position, front end 118 of the module assembly 102 extends or protrudes outwardly a specified distance from an EMI gasket collar 178 which is positioned in abutting contact with an interior surface (not shown in FIG. 2) of the bezel 108 (shown in FIG. 1) in use. The module assembly 102 is extended through collar 178 and guide frame 122. An ejector mechanism 180 is provided on the front end 118 of the module assembly 102 and includes a rotatably mounted bail 182 and spring-loaded actuator arms 184 extending on opposite sides thereof in a generally parallel direction to the side walls 132, 134 of guide frame 122.

The guide frame 122 includes a conductive body 126 that is formed from a metallic sheet plated with tin/lead in an exemplary embodiment. The body 126 is formed into a shell having a top wall 128, a bottom wall 130, and side walls 132, 134. The top wall 128, the bottom wall 130, and the side walls 132, 134 define the cavity 138 (shown in FIG. 1) in which the module assembly 102 is received.

The top wall 128 of the guide frame 122 includes a front portion 186, a rear portion 188, and opposed lateral portions 190, 192 that define a perimeter of the opening 148. The portions 186-192 of the top wall 128 also define a maximum distance that the heat sink 150 (shown in FIG. 1) extends into the interior cavity 138 (shown in FIG. 1) in which the module assembly 102 is contained. The top wall 128 supports the heat sink 150 when the heat sink 150 is mounted over the opening 148. Retention tabs 154 are punched from each of the respective side walls 132, 134 and bent outwardly. The retention tabs 154 engage mating openings 198 in the side rails 156 (shown in FIG. 1) in the clip 152 (also shown in FIG. 1) when the heat sink 150 is attached to the guide frame 122. In an exemplary embodiment, the retention tabs 154 are triangular in shape, which restricts the clip 152 from movement in both a vertical and horizontal direction relative to the guide frame 122, although it is recognized that other shapes for tabs 154 maybe employed.

The rear portion 188 of the top wall 128 includes positive stops 140 in the form of downwardly extending tabs that project slightly inward into opening 148 and downward into cavity 138. The stops 140 engage a rear surface of the module assembly 102 to prevent the module assembly 102 from passing rearwardly through the guide frame 122 beyond a specified distance. Each of the side walls 132, 134 of the guide frame 122 includes a latch element 196 that engages a respective actuator arm 184 of ejector mechanism 180. In the illustrated embodiment, the latch elements 196 are rectangular tabs punched from the respective side walls 132, 134 and bent inwardly into the interior of the cavity 138 of the guide frame 122. When the module assembly 102 is inserted in the guide frame 122, the latch elements 196 contact the side outer surfaces of the housing 110 (shown in FIG. 1) of the module assembly 102 and resiliently deflect outwardly to permit insertion of the module assembly 102. Once the module assembly 102 is inserted a predetermined distance into the guide frame 122, the latch elements 196 return to the latched position illustrated in FIG. 2 in engagement with the actuator arms 184.

Figure 3:
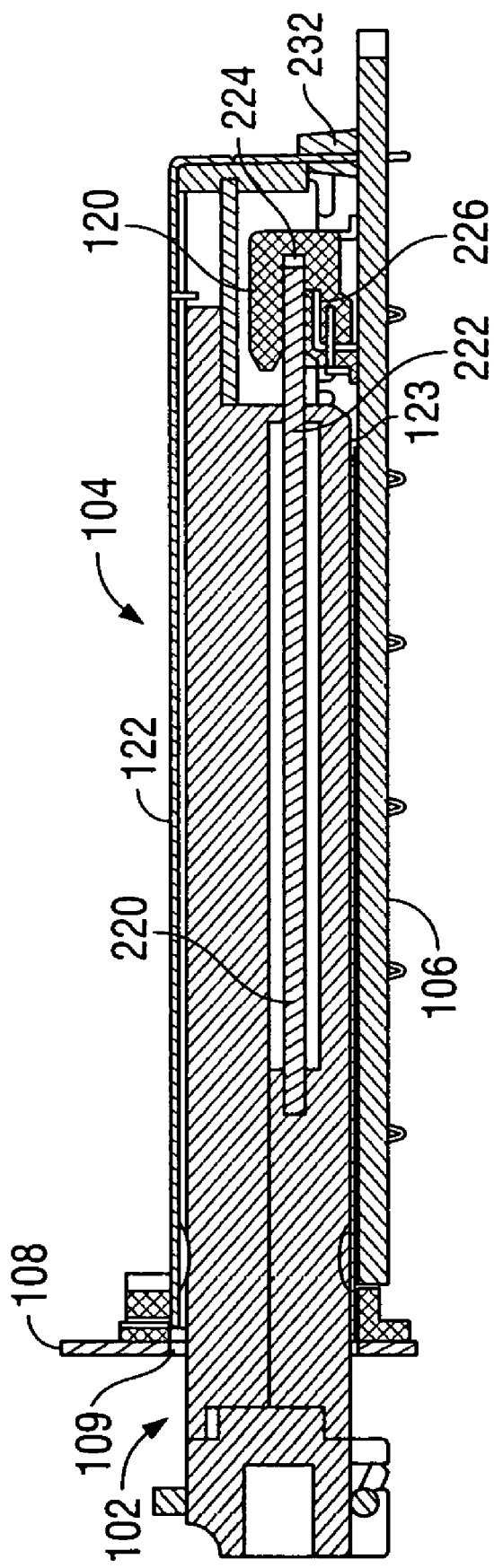
FIG. 3 is a cross sectional view of a portion of the assembly shown in FIG. 1, showing the module assembly in a latched position.

FIG. 3 is a cross sectional view of the module assembly 102 coupled to the receptacle assembly 104 with the module assembly 102 in the latched position. The module assembly 102 includes a printed circuit board 220 therein. An end 222 of the printed circuit board 220 is received in a slot 224 of the receptacle connector 120 which is mechanically and electrically mounted to the host board 106. The receptacle connector 120 includes electrical contacts 226 that contact conductive terminations on the end of the printed circuit board 220 to establish electrical connection to conductive paths on the host board 106. When the module assembly 102 is inserted in to the guide frame 122, the end 222 of the printed circuit board 220 is inserted into the connector slot 224, and when the module assembly 102 is fully inserted into the guide frame 122, the module assembly 102 is locked in the latched position with the printed circuit board 220 fully engaged to the receptacle connector 120.

Figure 4:
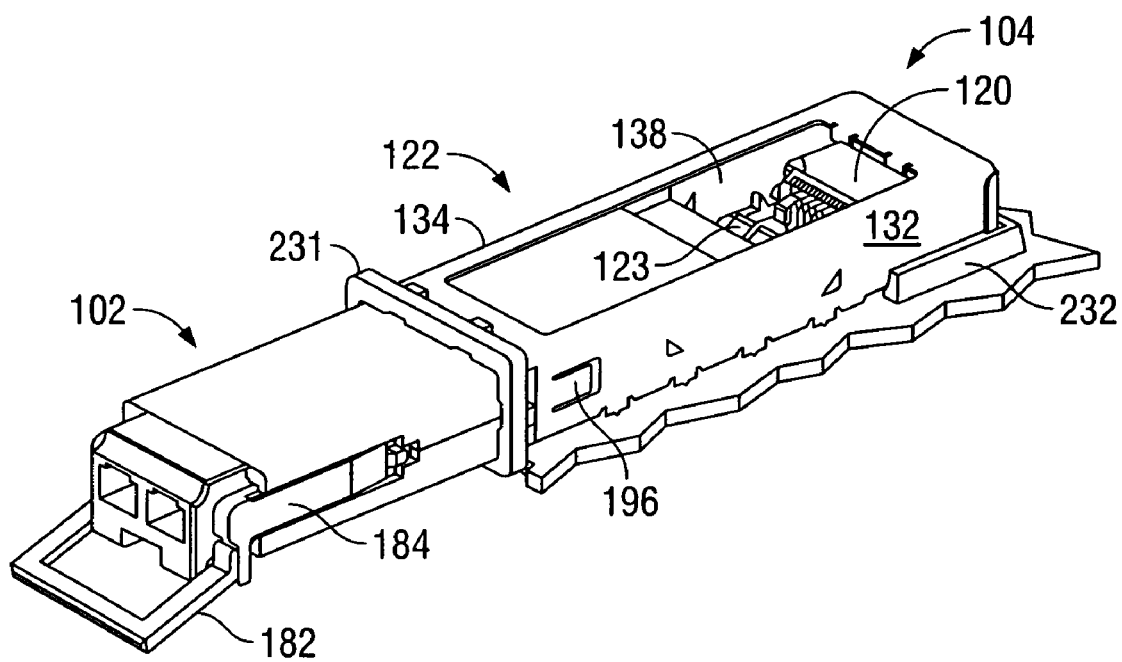
FIG. 4 is a perspective view of the assembly shown in FIG. 2 in an unlatched position.

FIG. 4 is a perspective view of the module assembly 102 partly inserted into receptacle assembly 104 and in an unlatched or released position. The bail 182 is positioned in an unlatched position which, as described below, causes the actuator arms 184 to release from the latch elements 196 in the side walls 132, 134 of the guide frame 122. The receptacle connector 120 is positioned in the rear of the cavity 138 in the guide frame 122, and the receptacle connector 120 is soldered to the host board 106. The guide frame 122 is electrically connected to the conductive surface 146 (shown in FIG. 1) of the host board 106 to provide an electromagnetic shielding cage about the module assembly 102 when coupled to the receptacle connector 120 in the latched position. The intermediate EMI gasket 123 is located in a lower portion of the cavity 138 forward of the receptacle connector 120. A rear EMI gasket 232 is disposed about the outer periphery of the rear end of the guide frame 122 adjacent the host board 106.

Figure 5:
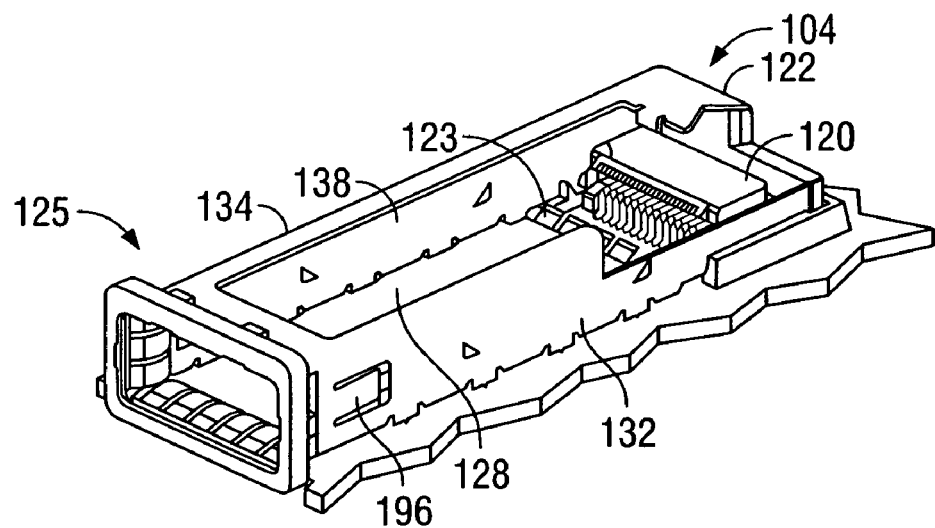
FIG. 5 is a partly broken away perspective view of the receptacle assembly shown in FIGS. 1–4.

FIG. 5 is a partly broken away perspective view of the receptacle assembly 104 with the module assembly 102 removed. The receptacle connector 120 is positioned in the rear end of the cavity 138 to receive the printed circuit board 220 (shown in FIG. 3) of the module assembly 102 (shown in FIG. 3). The intermediate EMI gasket 123 extends upwardly from the bottom wall 130 of the guide frame 122 into the path of the module assembly 102 when inserted into the cavity 138 of the guide frame 122. The latch elements 196 extend inwardly from the side walls 132, 134 of the guide frame 122 into the cavity 138 and also into the path of the module assembly 102.

Figure 6:
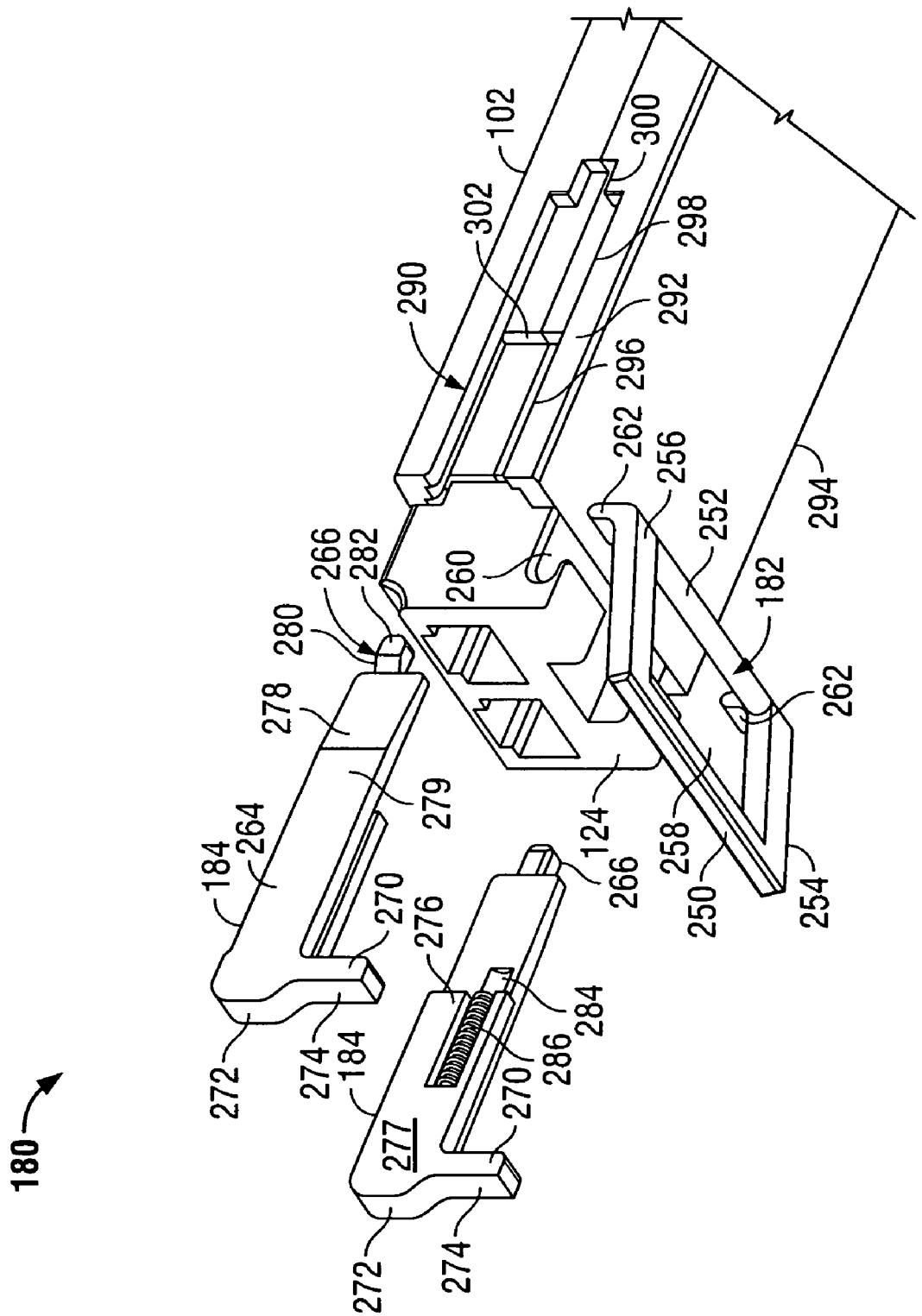
FIG. 6 is a front perspective assembly view of the module assembly shown in FIGS. 1–5 illustrating an ejector mechanism.

FIG. 6 is a front perspective assembly view of the module assembly 102 illustrating the ejector mechanism 180 which includes a pair of actuator arms 184 which are mirror images of one another and cooperate with a bail 182 to release the module assembly 102 from the latched position and to eject the module assembly 102 from the receptacle assembly 104 (shown in FIG. 1). The bail 182 is a generally rectangular body having a top side 250, a bottom side 252, and left and right sides 254, 256 defining an opening 258 which is dimensioned to receive the connector interface 124 of the module assembly 102. The connector interface 124 includes a slot 260 formed in a lower end thereof, and the bottom side 252 of the bail 182 is received in the slot 260 to pivotally mount the bail 182 to the module assembly 102. An angled foot portion 262 extends from each the lower corners of the bail 182 at the intersection of the bottom side 182 and the left and right sides 254, 256.

The actuator arms 184 include a main body portion 264 including an axially extending ejector tab 266, and a foot portion 270 extending substantially perpendicularly to the main body portion 264. A latched contact stop portion 272 extends on an opposite end of the main body 264 from the ejector tab 266 and extends outwardly from a forward end 274 of the foot portion 270. The main body portion 264 includes a stepped contour 276 on an interior surface 277 thereof and a tapered leading end 278 on an exterior surface 279. The tapered leading end 278 has a gradually reduced thickness to form a ramped surface extending to the ejector tab 266. The ejector tab 266 has a reduced width relative to the main body portion 264 and includes a ramped surface 280 extending to a raised boss 282.

The ramped surface 280 of the ejector tab 266 is inclined oppositely to the tapered leading end 278 of the actuator arms 184. That is, while the tapered leading end 278 is reduced in thickness in an axial or longitudinal direction of the main body 264, the ramped surface 280 of the ejector tab 266 is increased in thickness from the leading end 278 of the main body 264 to the boss 282 of the ejector tab 266. Thus, in a given orientation, if the tapered end 278 has a positive slope, the ramped surface 280 has a negative slope, or vice-versa. As illustrated in FIG. 6, the tapered end 278 and the ramped surface 280 are arranged side-by-side in a valley configuration and thus are sloped toward one another. Also, the angle of inclination of the ramped surface 280 is substantially steeper than the angle of inclination of the tapered end 278.

The interior surface 277 of each actuator arm 184 includes a longitudinal slot 284 which houses a bias element 286, such as a coil spring, in an exemplary embodiment. The bias element 286 provides spring-loaded release actuation of the module assembly 102 as the bail 182 is manipulated by a user.

The module assembly 102 includes a retention cavity 290 on each of the side walls 292, 294 thereof, and the retention cavities 290 are shaped generally complementary to the outer profile of the respective actuator arms 184. Thus, each of the retention cavities 290 includes a first portion 296, a second portion 298, and a third portion 300. The first portion 296 has a width slightly larger than a width of the main body portion 264 of the actuator arm 184 and a depth substantially equal to a full depth of the main body portion 264 (i.e., the depth of the thicker portion of the stepped contour 276 of the actuator arms 184). The second portion 298 has a width substantially equal to the first portion but a depth substantially equal to the reduced depth of the main body portion 264 adjacent the tapered leading end 278 (i.e., the depth of the thinner portion of the stepped contour 276 of the actuator arms 184). The third portion 300 has a substantially equal depth to the second portion 298 but a reduced width that is slightly larger than a width of the ejector tab 266. The first and second portions 296, 298 of the retention cavity 290 are configured to accept the stepped contour 276 of the main body portion 264 of the actuator arms 184, and the third portion 300 is configured to receive the ejector tab 266 with sliding engagement. A shoulder 302 separates the first portion 296 from the second portion 298 and provides an abutment or seat for the bias element 286 of each of the actuator arms 184.

When actuator arms 184 are received in the respective retention module cavities 290 of the module assembly 102 and when the bail 182 is mounted to the connector interface 124 and rotated upward so that foot portions 262 of the bail 182 contact the foot portions 270 of the actuator arms, the ejector mechanism 180 is engaged and ready for use.

As the module assembly 102 is inserted into the receptacle assembly 104, the ejector tabs 266 contact the latch elements 196 (shown in FIGS. 4 and 5) of the guide frame 122 and deflect the latch elements 196 outwardly to allow the module assembly 102 to be inserted into the guide frame 122. When the module assembly 102 is fully inserted, the ejector tabs 266 clear the latch elements 196, and the latch elements 196 deflect inwardly and rest upon the tapered leading ends 278 of the actuator arms 184. The ejector tabs 266 therefore become latched behind the latch elements 196 of the guide frame 122 when the module assembly 102 is fully installed in the guide frame 122.

In the latched position, the bail 182 is positioned substantially upright with the foot portions 262 of the bail 182 contacting the foot portions 270 of the actuator arms 184. The latched contact stop portions 272 of the actuator arms 184 contact the sides 254, 256 of the bail 182. The bias elements 286 are loaded in compression and maintain the bail 182 in the latched position.

As the bail 182 is pivoted away from the interface connector 124 about its lower end, the foot portions 262 of the bail 182 slide upwardly against the foot portions 270 of the actuator arms 184. The angled foot portions 262 of the bail 182 cause the actuator arms 184 to move longitudinally inward into the retention cavities 290, thereby further loading the bias elements 286 in the actuator arms 184. Further pivoting of the bail 182 permits the bias elements 286 to relax and push the actuator arms 184 forward toward the connector interface 124. At this point, the latch elements 196 of the guide frame 122 are in contact with the ramped surfaces 280 of the ejector tabs 266 of the actuator arms 184. As the bias elements 286 force the actuator arms 184 in a forward direction, the ramped surfaces 280 deflect the latch elements outwardly until the boss 282 clears the latch elements 196. The actuator arms 184 are displaced forwardly by the bias elements 286, and the retention tabs 266 are released from the latch elements 196 of the guide frame 122. In the unlatched position, the module assembly 102 may be removed from the receptacle assembly 104 by pulling the bail 182 to slide the module assembly 102 out of the receptacle assembly 104. The bias elements 286 maintain the bail 182 in the latched position until the bail 182 is actuated to the latched position described above.

The bail 182 may be pivoted back toward the connector interface 124 to position the actuator arms 184 back to the latched position wherein the ejector tabs 266 may be engaged to the latch elements 196 of the receptacle assembly 104.

Figure 7:
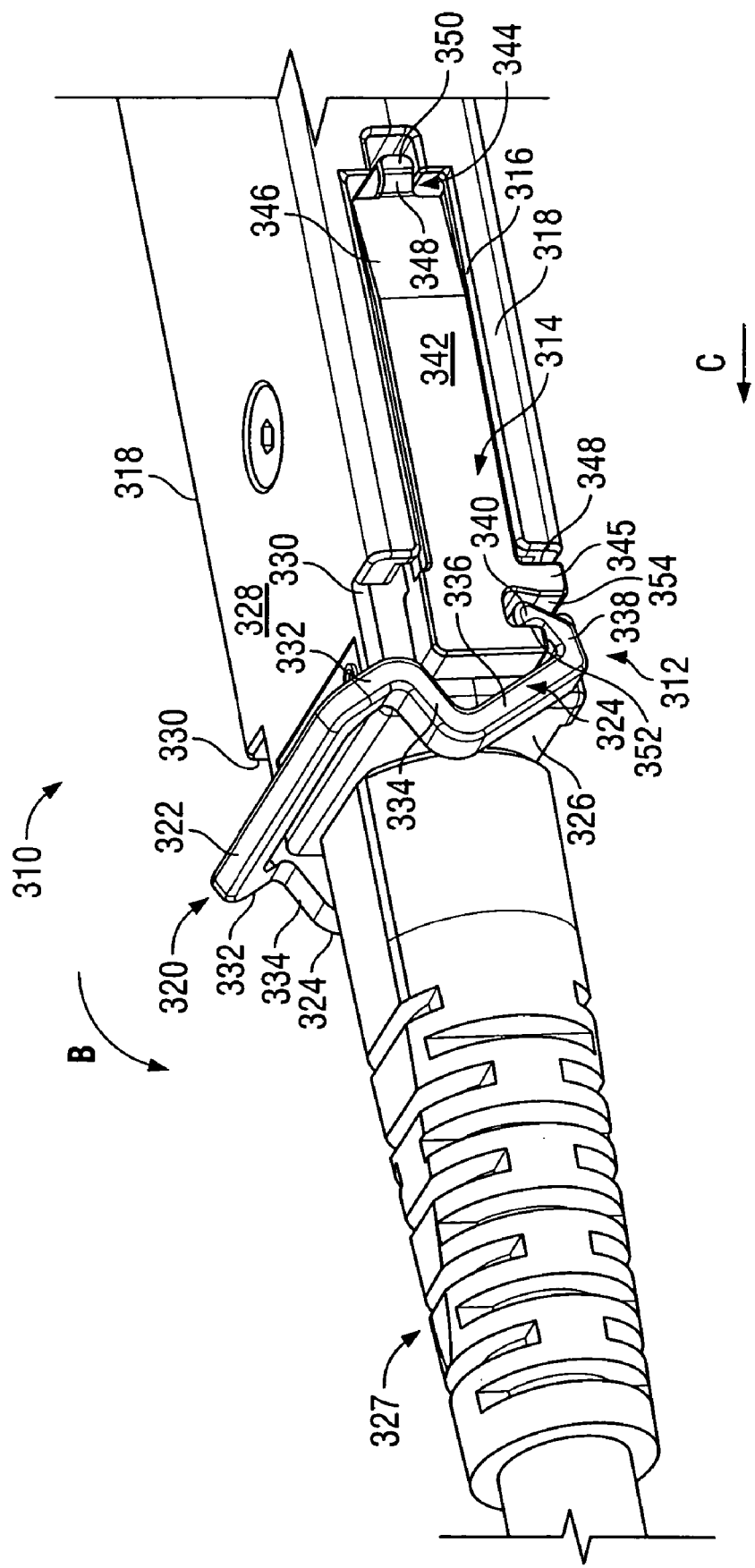
FIG. 7 is a perspective view of a module assembly including a release mechanism formed in accordance with an exemplary embodiment of the present invention and in an unlatched position.

FIG. 7 is a perspective view of a module assembly 310 including a release mechanism 312 formed in accordance with an exemplary embodiment of the present invention. The module assembly 310 is constructed substantially similar to the module assembly 102 described above except as noted below, and is adapted for use with a receptacle assembly such as the receptacle assembly 104 described above.

Like the ejector mechanism 180 (shown in FIG. 6 and described above), the release mechanism 312 includes a pair of actuator arms 314 which are mirror images of one another and extend within retention cavities 316 formed within the side walls 318 of the module assembly 310. The actuator arms 314 extend longitudinally along the side walls 318, and the actuator arms 314 cooperate with a bail 320 to release the module assembly 310 from the receptacle assembly 104 as described below.

In the illustrated embodiment, the bail 320 includes a top side 322 extending transversely across the module assembly 310 between the side walls 318, and two opposing lateral sides 324 which extending downward from the top side 322 in a plane parallel to the sides 318 of the module assembly 312. The top side 322 and lateral sides 324 are dimensioned to receive a connector interface 326 of the module assembly 312 which provides a site for connection to a cable assembly 327, which may include an optical fiber or electrical cable, strain relief features, etc. The connector interface 326 includes an aperture (not shown) on each lateral side of the module assembly 310, and each of the lateral sides 324 of the bail includes an inward facing cylindrical pin (not shown) which fits into the apertures to pivotally or rotatably mount the lateral sides 324 of the bail 320 to the module assembly 312.

In an exemplary embodiment, the front end 328 of the module assembly 310 includes notched corners 330 which facilitate operation of the bail 320 as described below. The lateral sides 324 of the bail include downwardly extending vertical portions 332 extending substantially perpendicularly to the horizontal top side 322 at either end thereof. Horizontal shelf portions 334 extend in a perpendicular orientation from the vertical portions 332 but in the same plane as the vertical portions 332 of the bail 320, and vertical actuator portions 336 extend from the shelf portions 334 in a parallel arrangement to the vertical portions 332. A hook portion 338 extends from distal ends of each of the actuator portions 336 of the bail 320, and the hook portions 338 include engagement ledges 340 extending opposite the actuator portions 336.

The actuator arms 314 include a main body portion 342 including an axially extending ejector tab 344, and a foot portion 345 extending substantially perpendicularly to the main body portion 342. A latched contact stop portion 348 extends on an opposite end of the main body 342 from the ejector tab 344. The main body portion 342 includes a tapered leading end 346 which has a gradually reduced thickness to form a ramped surface extending to the ejector tab 344. The ejector tab 344 has a reduced width relative to the main body portion 342 and includes a ramped surface 348 extending to a raised boss 350. The ramped surface 348 of the ejector tab 344 is inclined oppositely to the tapered leading end 346 of the actuator arms 314.

The foot portion 345 of the actuator arms 314 includes a vertical opening or slot 354 which defines an engagement surface 352 for the hook 338 of the bail 320. As illustrated in FIG. 7, the bail 320 is rotated about the front end 328 of the module assembly 310 in the direction of arrow B until the ledge 340 of the hook 338 is in contact with the engagement surface 352 of the slot 354 in the actuator arms 314. When the module assembly 310 is inserted to a receptacle assembly, such as the receptacle assembly 104 described above, the latch elements 196 (shown in FIGS. 2, 4 and 5) of the guide frame 122 are in contact with the ramped surfaces 348 of the ejector tabs 344 of the actuator arms 314.

As the bail 320 continues to be rotated in the direction of arrow B, the engagement of the ledges 340 and the hooks 338 displace or pull the actuator arms 314 in a direction of arrow C which extends parallel to a longitudinal axis of the module assembly 310. As the actuator arms 314 are moved in the forward direction of Arrow C, the ramped surfaces 348 outwardly deflect the latch elements 196 of the guide frame 122 until the boss 350 clears the latch elements 196 and the retention tabs 266 are released from the latch elements 196 of the guide frame 122. In the unlatched position, the module assembly 310 may be removed from the receptacle assembly by pulling the bail 320 in the direction of arrow C to slide the module assembly 310 out of the receptacle assembly.

Due to direct engagement of the hooks 338 of the bail 320 and the slots 354 of the actuator arms 314, release of the module assembly 310 from a receptacle assembly 104 is accomplished without internal spring elements. Manufacturing and assembly costs are therefore reduced while nonetheless providing an effective and reliable latch and release mechanism.

Figure 8:
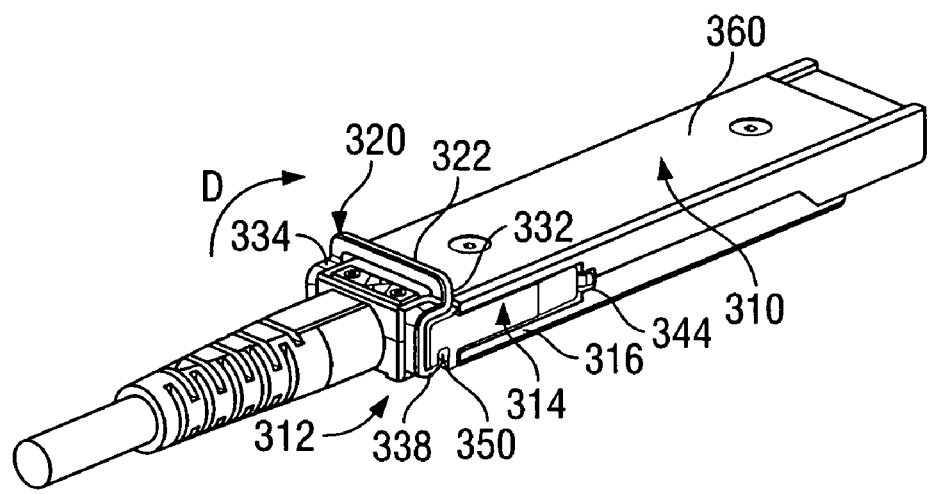
FIG. 8 is a perspective view of the module assembly and release mechanism shown in FIG. 7 in a latched position.

FIG. 8 is a perspective view of the module assembly 310 and release mechanism 312 in a latched position. To latch the module assembly 310 to the receptacle assembly 104, the bail 320 is pivoted or rotated from the unlatched position (shown in FIG. 7) back toward the module assembly 310 in the direction of arrow D. In the latched position, the actuator arms 314 are moved backward within the module retention cavities 316 wherein the ejector tabs 344 are engaged to the latch elements 196 of the receptacle assembly 104.

The shelf portions 334 of the bail 320 are seated in the notched corners 330 (shown in FIG. 7) of the module assembly 310 when the bail 320 is in the latched position, and the vertical portions 332 of the bail 320 serve as stops to prevent further rotation of the bail in the direction of arrow D once the latched position is obtained. The top side 322 of the bail extends above the top surface 360 of the retention module 310 and the bail 320 is easily accessed for rotation to the unlatched position to release the module assembly 310 as desired. The hooks 338 of the bail 320 are generally aligned with the slots 354 in the actuator arms 314, and the ledges 340 (shown in FIG. 7) of the hooks 338 are separated from the engagement surfaces 352 (shown in FIG. 7) of the actuator arms 314. As such, the hooks 338 are disengaged from the actuator arms 314 in the latched position.

Figure 9:
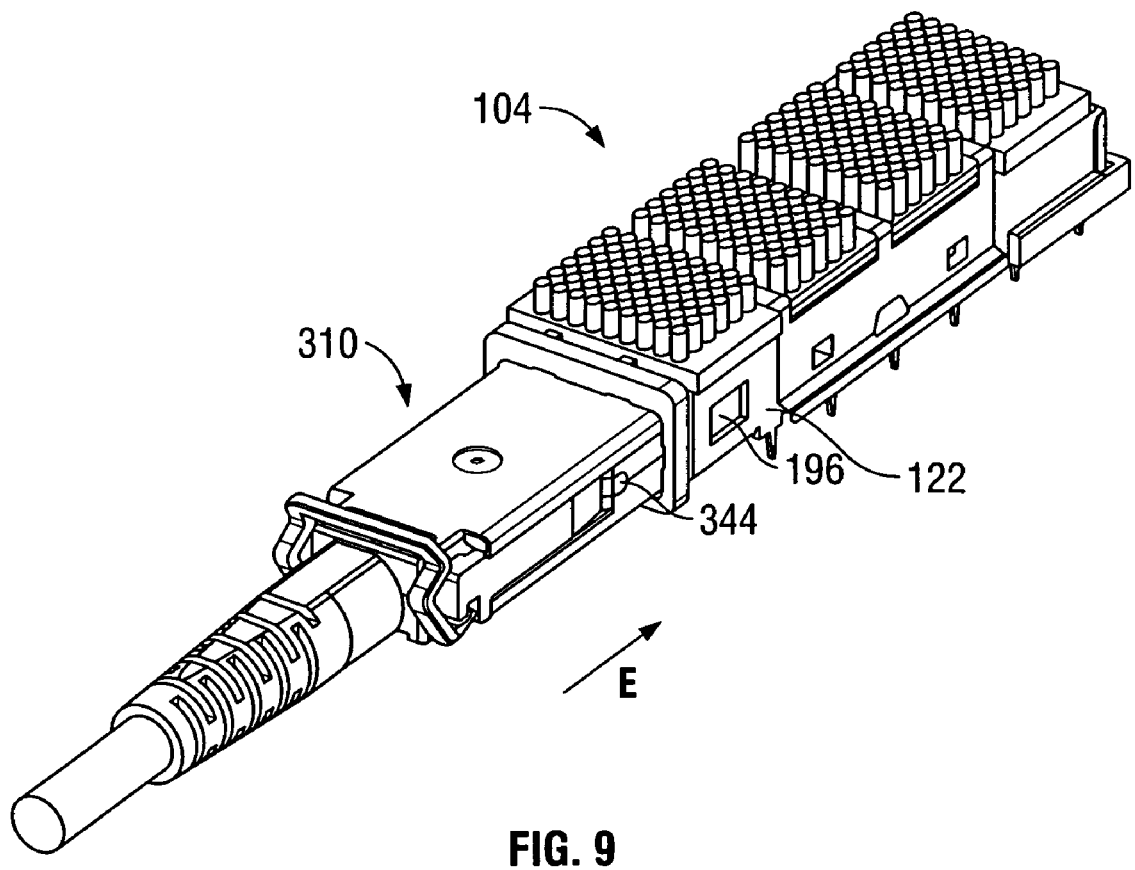
FIG. 9 is a perspective view of the module assembly shown in FIGS. 8 and 9 partly inserted into a receptacle and guide frame assembly.
Figure 10:
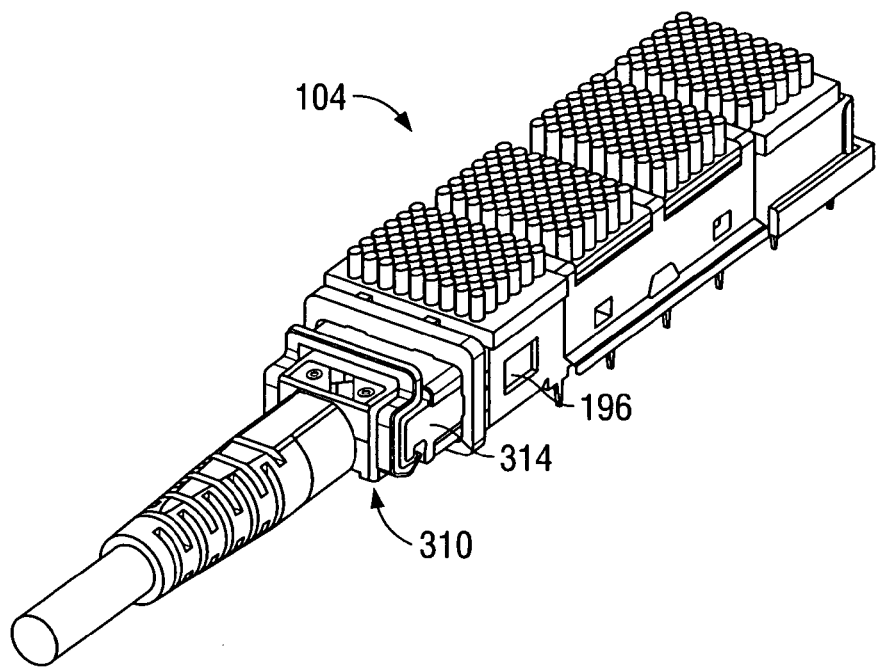
FIG. 10 is a perspective view of the module assembly shown in FIGS. 8 and 9 latched to the receptacle and guide frame assembly.

FIG. 9 is a perspective view of the module assembly 310 partly inserted into the receptacle assembly 104. As the module assembly 310 is inserted into the receptacle assembly 104, the ejector tabs 344 contact the latch elements 196 of the guide frame 122 and deflect the latch elements 196 outwardly to allow the module assembly 310 to be inserted into the guide frame 122 in a direction of arrow E. When the module assembly 310 is fully inserted, as shown in FIG. 10, the ejector tabs 344 clear the latch elements 196, and the latch elements 196 deflect inwardly and rest upon the tapered leading ends 346 (shown in FIG. 7) of the actuator arms 314. The ejector tabs 344 therefore become latched behind the latch elements 196 of the guide frame 122 when the module assembly 102 is fully installed in the guide frame 122.

FIG. 10 is a perspective view of the module assembly 310 fully inserted into the receptacle assembly 104. The bail 320 is rotated to the latched position, and the module assembly 310 is securely latched to the receptacle assembly 104. The module assembly 310 may be unlatched by rotating the bail 320 in the direction of arrow B as shown in FIG. 7 until the bail hooks 338 engage the actuator arms 314 to release the module assembly 310 from the receptacle assembly 104.

Figure 11:
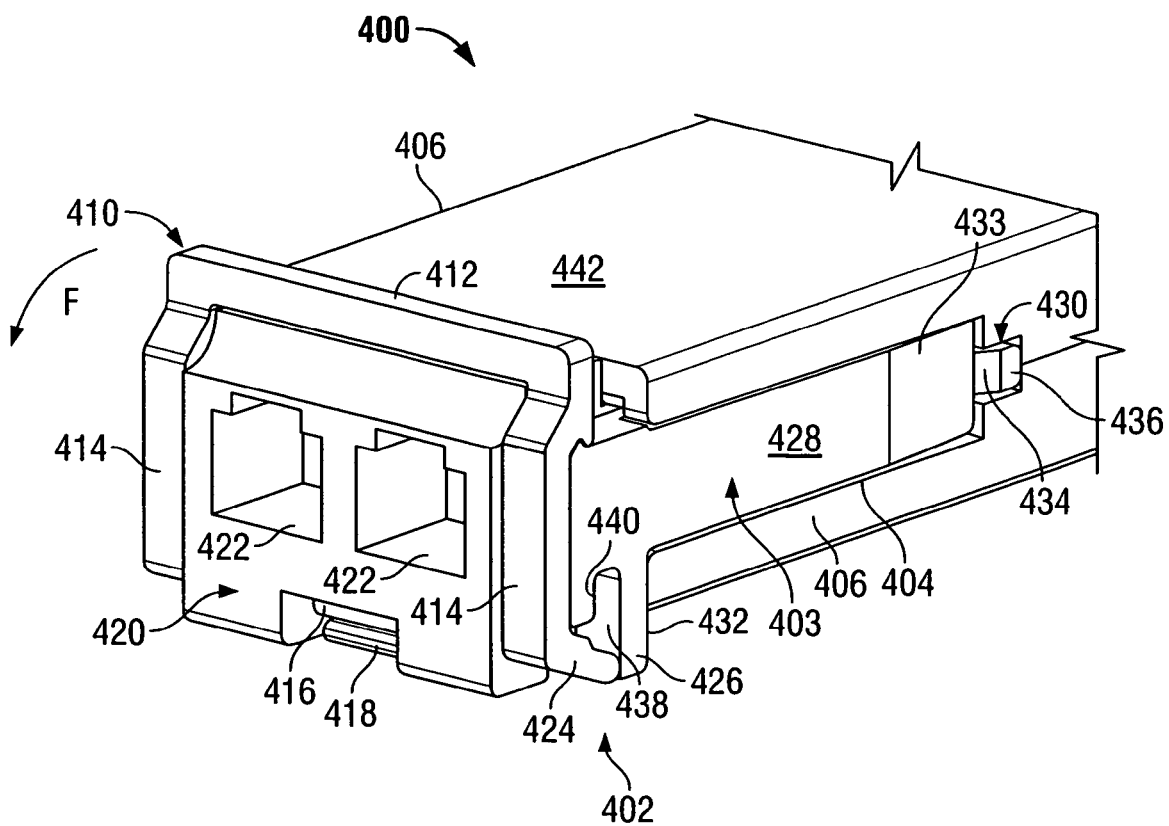
FIG. 11 is a top perspective view of another embodiment of a module assembly and release mechanism formed in accordance with an exemplary embodiment of the invention.
Figure 12:
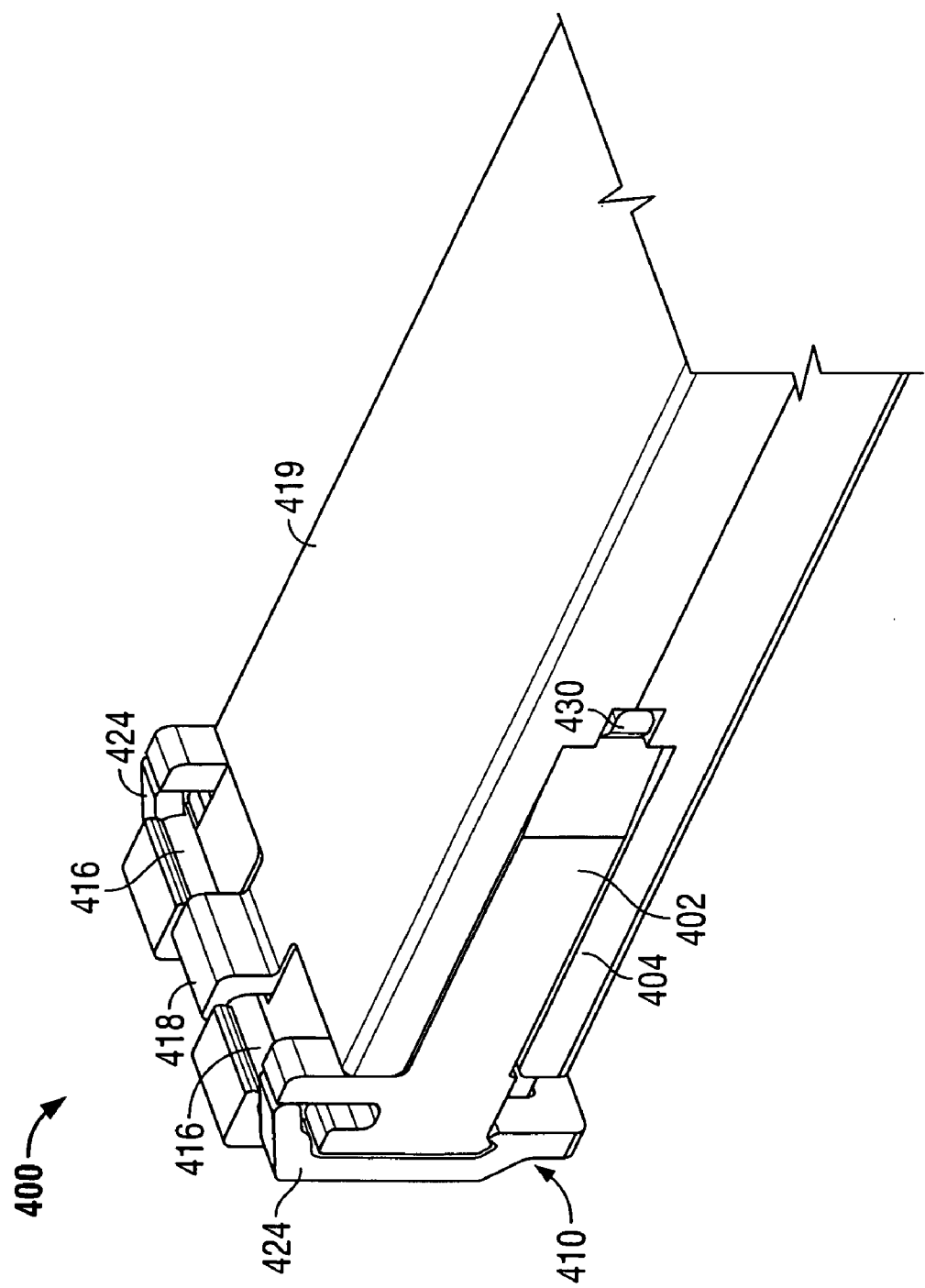
FIG. 12 is a bottom perspective view of the module assembly and release mechanism shown in FIG. 11.

FIGS. 11 and 12 are top and bottom perspective views, respectively, of another embodiment of a module assembly 400 and associated release mechanism 402 formed in accordance with an exemplary embodiment of the invention. The module assembly 400 is constructed substantially similar to the module assembly 102 described above except as noted below. The module assembly 402 is adapted for use with a receptacle assembly, such as the receptacle assembly 104 described above.

Like the release mechanism 312 (shown in FIGS. 7–10), the release mechanism 400 includes a pair of actuator arms 403 which are mirror images of one another and extend within retention cavities 404 formed within the side walls 406 of the module assembly 400. The actuator arms 403 extend longitudinally along the side walls 406, and the actuator arms 403 cooperate with a bail 410 to release the module assembly 400 from a receptacle assembly 104 as described above.

In the illustrated embodiment, the bail 410 includes a top side 412 extending transversely across the module assembly 400 between the side walls 406 of the module assembly 400, two opposing lateral sides 414 which extend downward from the top side 412 in a plane parallel to the sides 406 of the module assembly 400, and a bottom side 416 extending between the lateral sides 414. A shelf 418 (best seen in FIG. 12) is provided in a bottom side 416 of the module assembly 400, and the bottom side 416 of the bail 410 is both retained by the shelf 418 and rotates upon the shelf 418 as described below.

The bail 410 is dimensioned to receive a connector interface 420 of the module assembly 400 which provides a site for connection to a cable assembly (not shown in FIG. 11). The connector interface 400 includes an aperture 422 on each lateral side of the module assembly 400 for connection of a cable assembly, which may be a fiber or electrical cable in different embodiments.

In an exemplary embodiment, the lateral sides 414 of the bail 410 include angled foot portions 424 which contact a foot portion 426 of each actuator arm 403. The actuator arms 403 include a main body portion 428 including an axially extending ejector tab 430, and the foot portion 426 extends substantially perpendicularly to the main body portion 428. A latched contact stop portion 432 extends on an opposite end of the main body 428 from the ejector tab 430. The main body portion 428 includes a tapered leading end 433 which has a gradually reduced thickness to form a ramped surface extending to the ejector tab 430. The ejector tab 430 has a reduced width relative to the main body portion 428 and includes a ramped surface 434 extending to a raised boss 436. The ramped surface 434 of the ejector tab 430 is inclined oppositely to the tapered leading end 434 of the actuator arms 403.

The foot portion 426 of the actuator arms 403 includes a vertical opening or slot 438 which defines an engagement surface 440 for the foot portions 424 of the bail 410 as described below. As illustrated in FIG. 11, the bail 410 is in a latched position, and the bail 410 may be rotated about the front end 442 of the module assembly 400 in the direction of arrow F to unlatch the module assembly 400 from a receptacle assembly 104.

Figure 13:
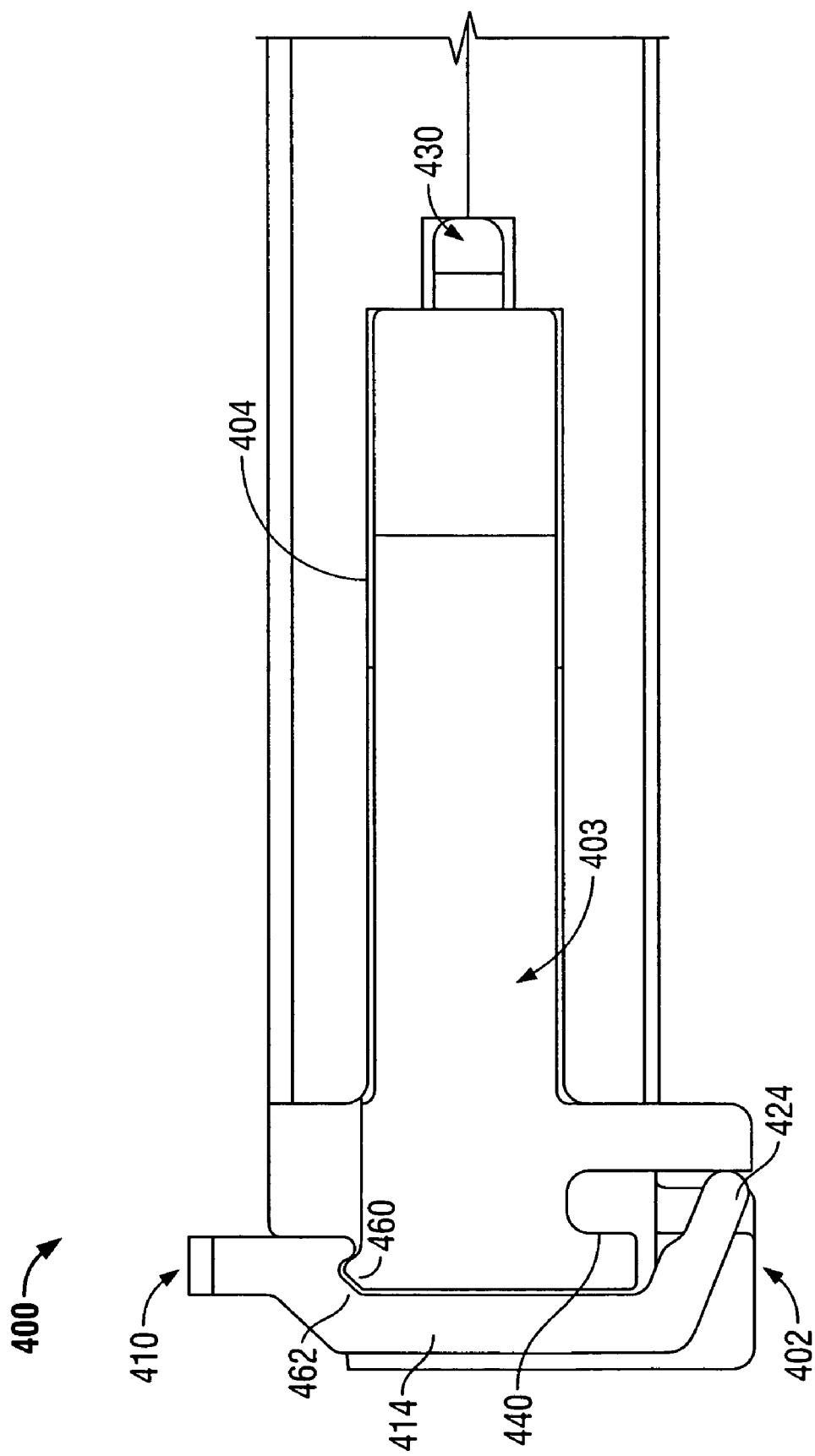
FIG. 13 is a side elevational view of the module assembly and release mechanism shown in FIGS. 11 and 12 in a latched position.

FIG. 13 is a side elevational view of the module assembly 400 and release mechanism 402 in a latched position. The bail 410 is retained in the latched position with snap fit engagement of a rib 460 of the actuator arms 403 within a slot 462 in the lateral sides 414 of the bail 410.

Figure 14:
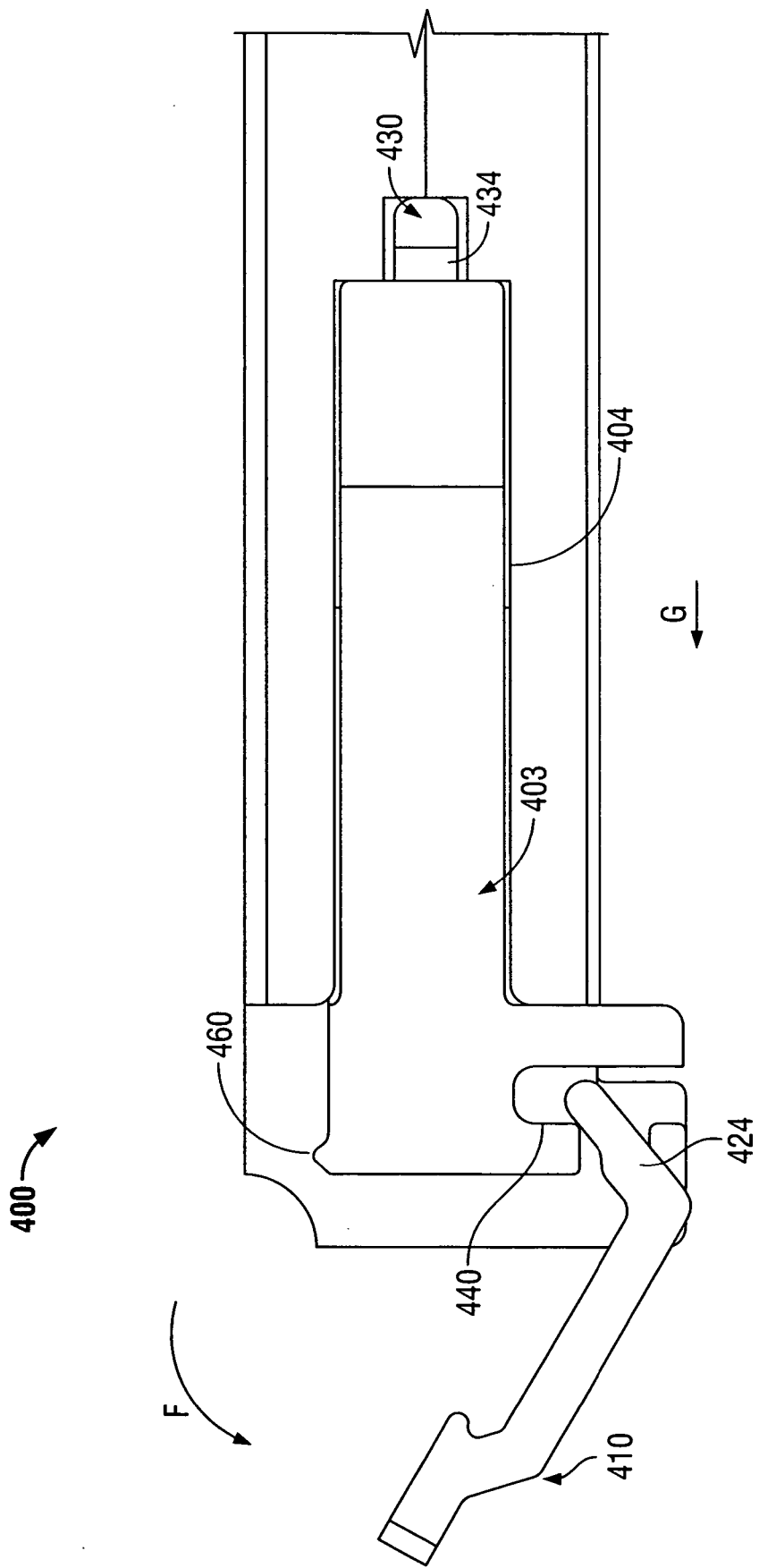
FIG. 14 is a side elevational view of the module assembly and release mechanism shown in FIG. 13 in an intermediate position.
Figure 15:
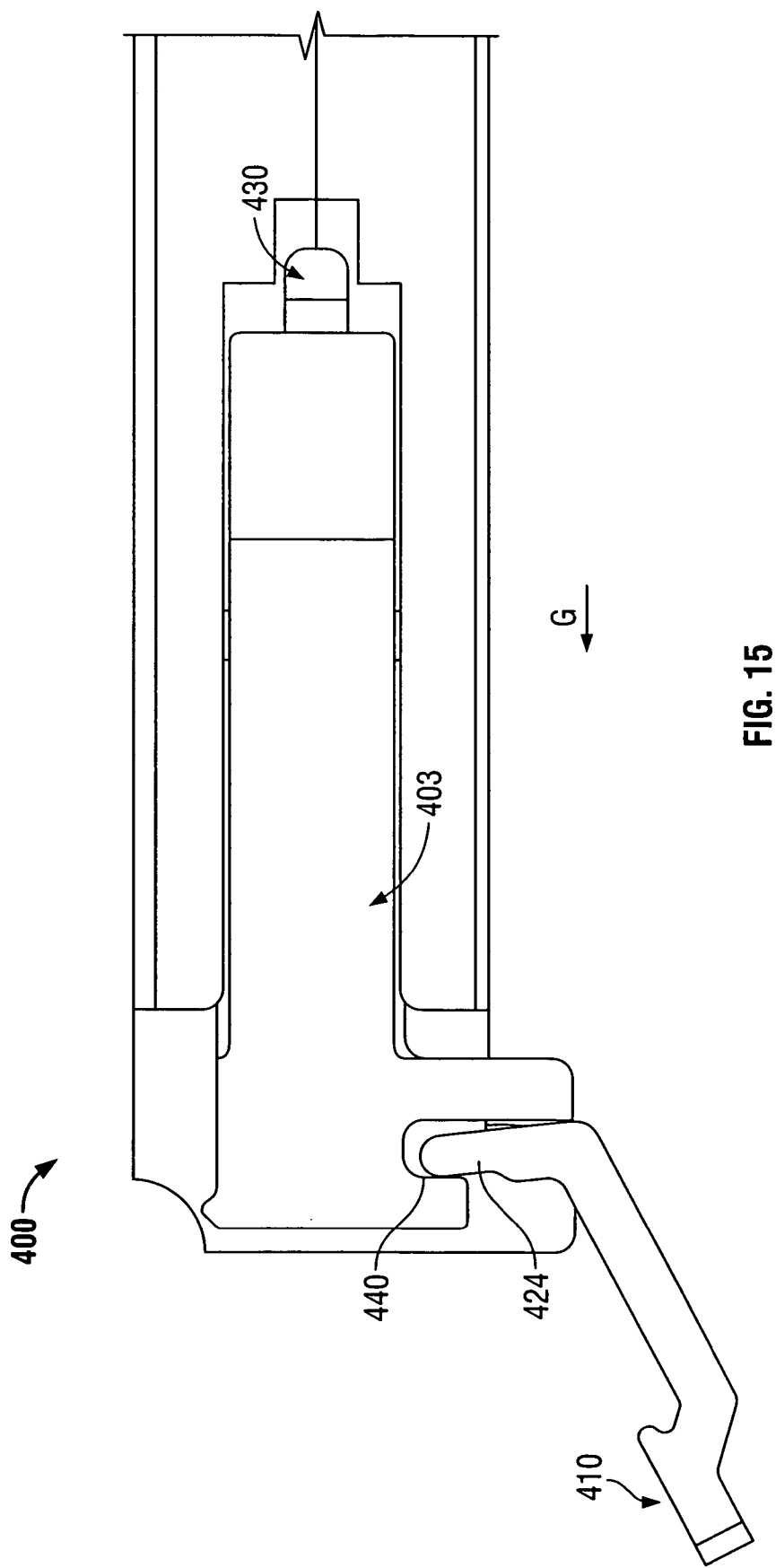
FIG. 15 is a side elevational view of the module assembly and release mechanism shown in FIG. 13 in an unlatched position.

When the lateral sides 414 of the bail 410 are lifted off the ribs 460, as illustrated in FIG. 14, the bail 410 may be rotated in the direction of arrow F to an unlatched position. As the bail 410 continues to be rotated in the direction of arrow F, the engagement of the bail foot portions 424 and the engagement surface 440 of the actuator arms 403 displace or pull the actuator arms 403 in a direction of arrow G which extends parallel to a longitudinal axis of the module assembly 400. As the actuator arms 403 are moved in the forward direction of arrow G, the ramped surfaces 434 of the ejector tabs 430 outwardly deflect the latch elements 196 of the guide frame 122 until the boss 436 clears the latch elements 196 and the retention tabs 430 are released from the latch elements 196 of the guide frame 122. In the unlatched position (shown in FIG. 15), the module assembly 400 may be removed from the receptacle assembly 104 by pulling the bail 410 in the direction of arrow G to slide the module assembly 400 out of the receptacle assembly 104.

Due to direct engagement of the foot portions 424 of the bail 410 and the slots 438 of the actuator arms 403, release of the module assembly 400 from a receptacle assembly is accomplished without internal spring elements. Manufacturing and assembly costs are therefore reduced while nonetheless providing an effective and reliable latch and release mechanism.

Figure 16:
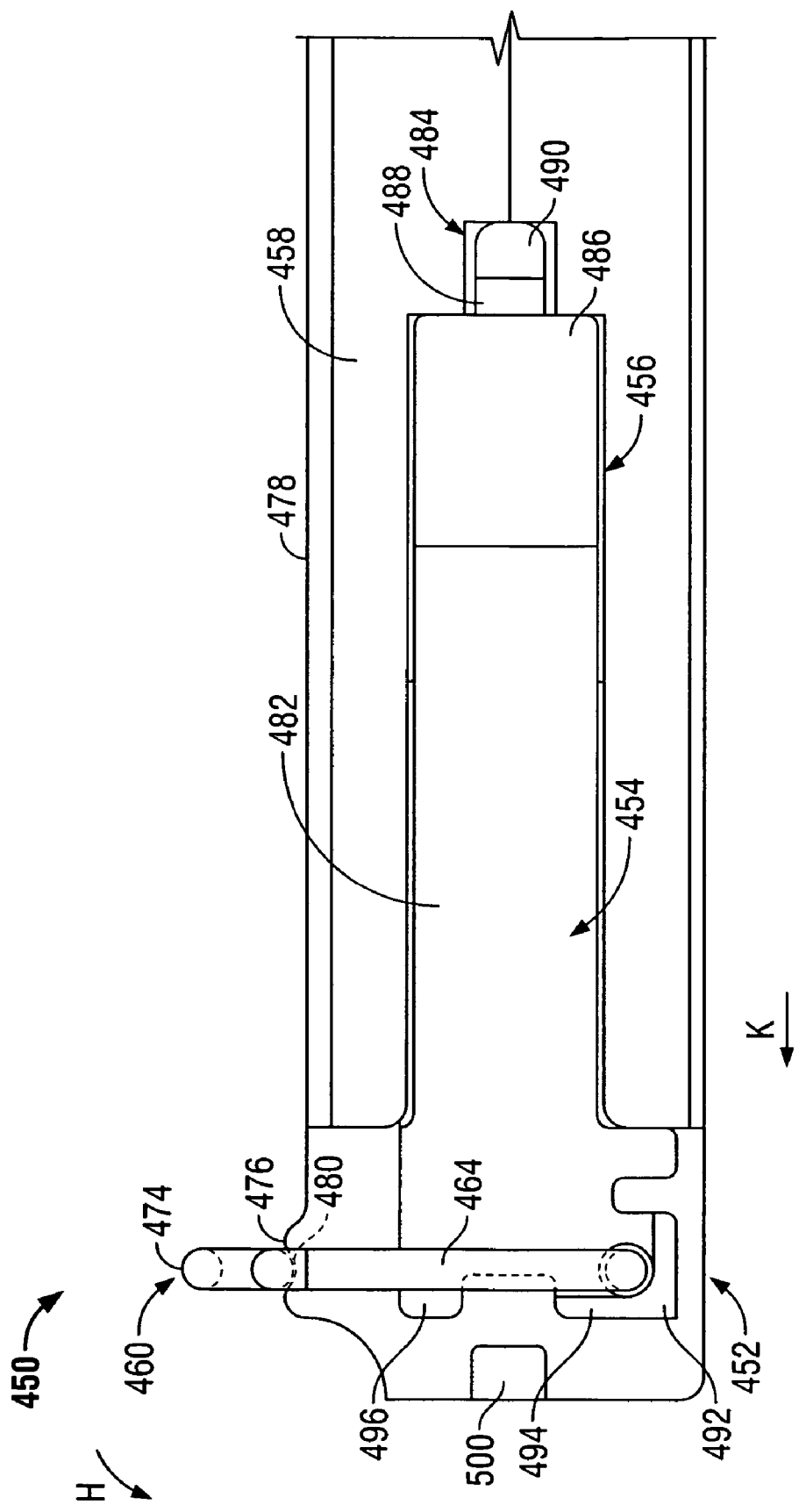
FIG. 16 is a side elevational view of another embodiment of a module assembly and release mechanism formed in accordance with an exemplary embodiment of the invention.
Figure 17:
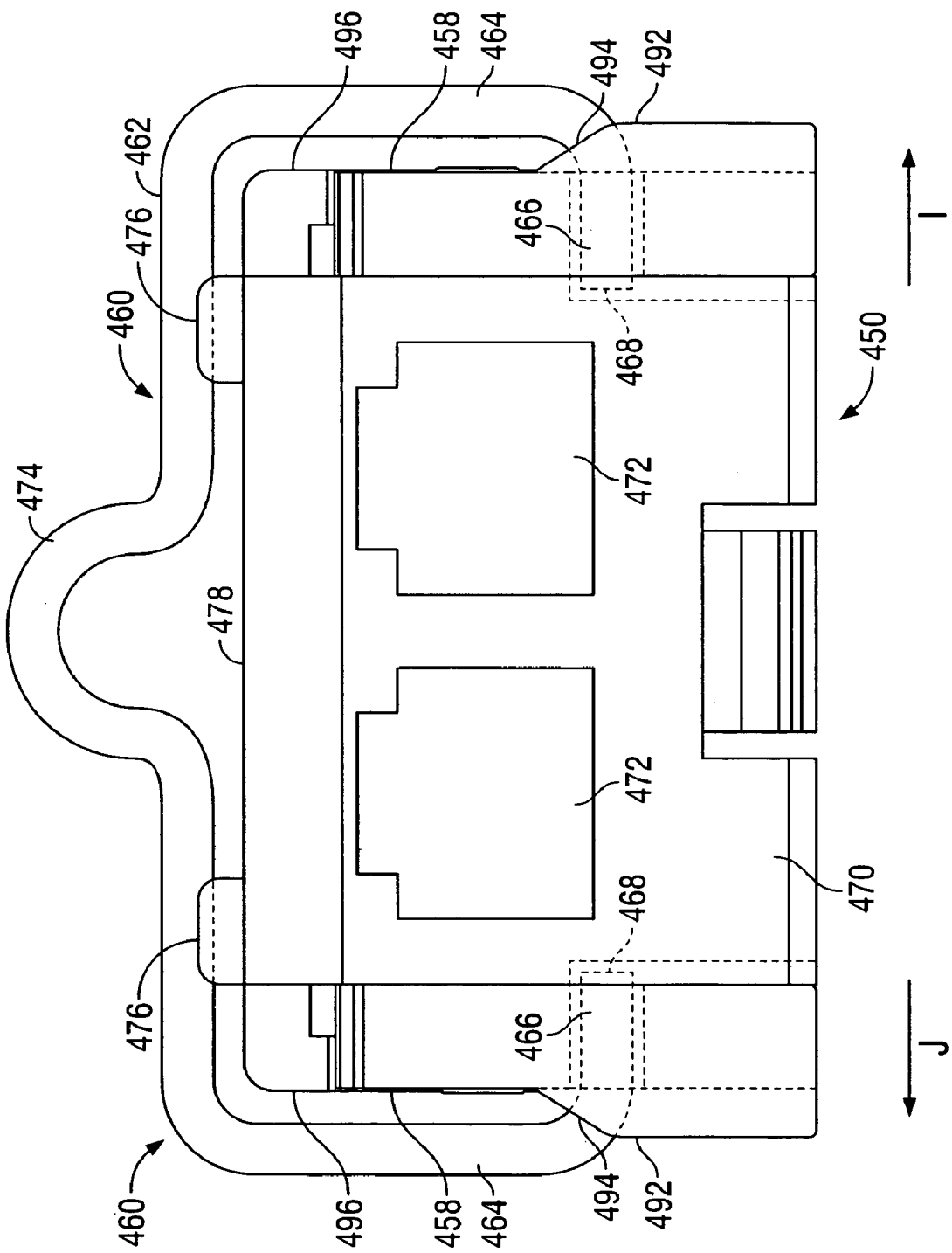
FIG. 17 is an end elevational view of the module assembly and release mechanism shown in FIG. 16.

FIG. 16 and 17 are a side elevational view and a front elevational view, respectively, of another embodiment of a module assembly 450 including a release mechanism 452 formed in accordance with an exemplary embodiment of the invention. The module assembly 450 is constructed substantially similar to the module assembly 102 described above except as noted below. The module assembly 450 is adapted for use with a receptacle assembly, such as the receptacle assembly 104 described above.

Like the release mechanism 400 (shown in FIGS. 11–15), the release mechanism 452 includes a pair of actuator arms 454 which are mirror images of one another and extend within retention cavities 456 formed within the side walls 458 of the module assembly 450. The actuator arms 454 extend longitudinally along the side walls 458, and the actuator arms 454 cooperate with a bail 460 to release the module assembly 450 from a receptacle assembly 104.

In the illustrated embodiment, the bail 460 includes a top side 462 extending transversely across the module assembly 450 between the side walls 458 of the module assembly 450, two opposing lateral sides 464 which extend downward from the top side 462 in a plane parallel to the sides 458 of the module assembly 450, and bottom pins 466 extending inward from each of the lateral sides 464. Slots 468 are provided in a connector interface 470 of the module assembly 450 which receive the pins 466 of the bail 460 and permit rotation of the bail 460 with respect to the module assembly 450 while retaining the actuator arms 454 in a latched position within the retention cavities 465 in the module side walls 458. The connector interface 470 includes an aperture 472 on each lateral side of the module assembly 400 for connection of a cable assembly, which may be a fiber or electrical cable in different embodiments.

The top side 462 of the bail 460 includes a raised central section 474 which serves as a handle for actuating the bail 460. Projections 476 extend upward from a top surface 478 of the module assembly 450, and the projections include a depressed upper surface 480 which provides a sear for the top side 462 of the bail 460 on either side of the raised central section 474 when the bail 460 is in a latched position. In an exemplary embodiment the bail 460 is a wire formed member having a substantially circular cross section. In an alternative embodiment, the bail 460 may be formed and fabricated by other methods, including but not limited to injection molding processes.

The actuator arms 454 include a main body portion 482 including an axially extending ejector tab 484. The main body portion 482 includes a tapered leading end 486 which has a gradually reduced thickness to form a ramped surface extending to the ejector tab 484. The ejector tab 484 has a reduced width relative to the main body portion 482 and includes a ramped surface 488 extending to a raised boss 490. The ramped surface 488 of the ejector tab 484 is inclined oppositely to the tapered leading end 486 of the actuator arms 454. Raised release surfaces 492 are provided on the forward end of each of the actuator arms 454, and the raised surfaces 492 include ramped portions 494 which provide a transition from an outer surface 496 of the main body portions 482 of the actuator arms 454 to the raised release surfaces 492.

As illustrated in FIG. 16, the bail 460 is in a latched position, and the bail 460 may be rotated about the module assembly 450 in the direction of arrow H to unlatch the module assembly 400 from a receptacle assembly 104. When the bail 460 is lifted from the projections 476 and rotated in the direction of arrow H, the lateral sides 464 of the bail 460 engaged the ramped portions 494 and flex the bail 460 in a manner that causes the pins 466 to be pulled outwardly in the direction of arrows I and J (FIG. 17), thereby removing the pins 466 from the slots 468 (FIG. 17) and permitting sliding movement of the actuator arms 454 in the direction of arrow K (FIG. 16) when the bail 460 is pulled in the direction of arrow K. When the actuator arms 454 are moved in the direction of arrow K, the ramped surfaces 488 of the ejector tabs 484 outwardly deflect the latch elements 196 of the guide frame 122 until the boss 490 clears the latch elements 196 and the retention tabs 484 are released from the latch elements 196 of the guide frame 122 to an unlatched position. In the unlatched position, the module assembly 450 may be removed from the receptacle assembly 104 by pulling the bail 460 in the direction of arrow K to slide the module assembly 450 out of the receptacle assembly 104.

A stop surface 500 may be provided on the module side walls 458 to prevent rotation of the bail 460 in the direction of arrow H beyond a predetermined point.

Release of the module assembly 450 from a receptacle assembly 104 is accomplished without internal spring elements. Manufacturing and assembly costs are therefore reduced while nonetheless providing an effective and reliable latch and release mechanism.

Figure 18:
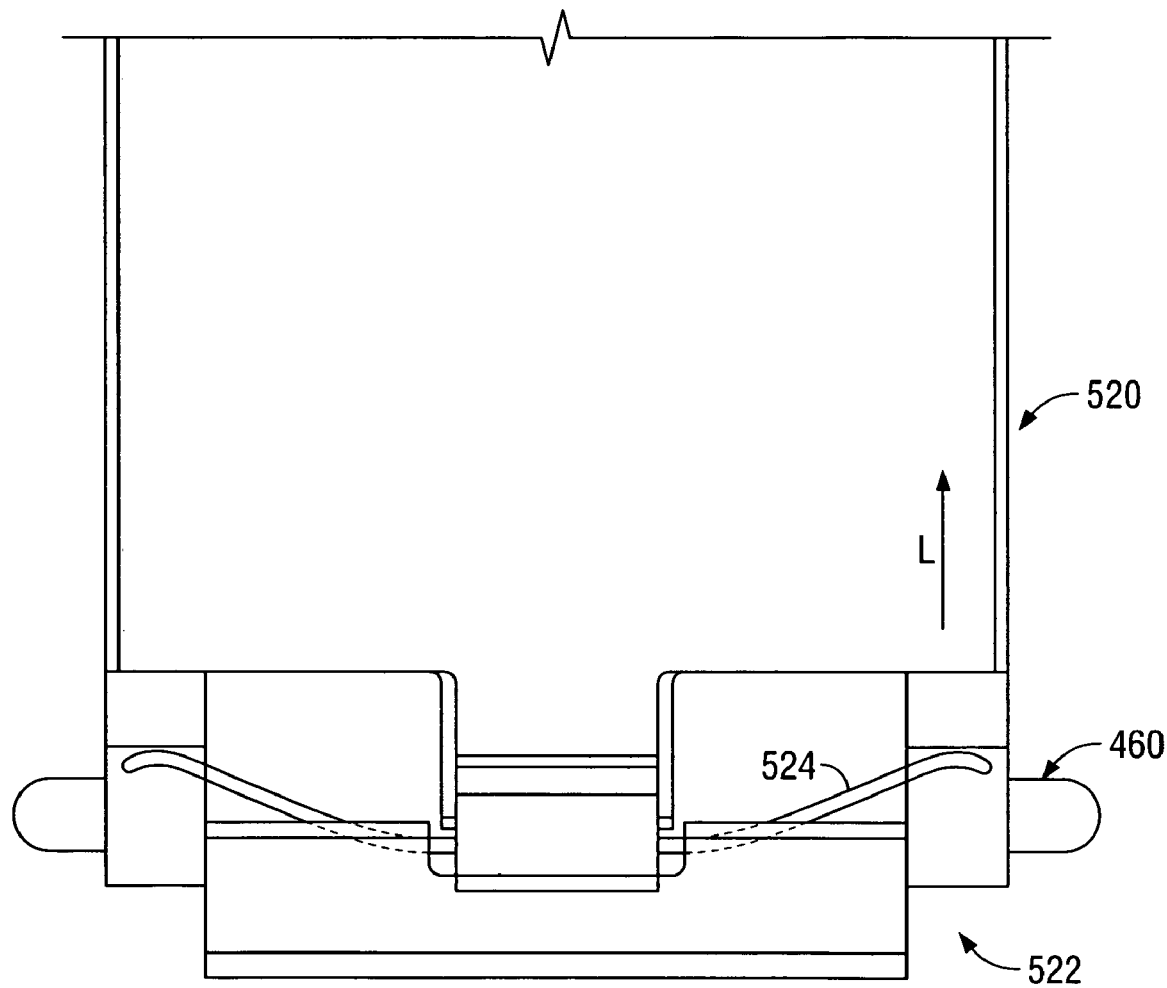
FIG. 18 is a side elevational view of the module assembly and release mechanism shown in FIG. 17.

FIG. 18 is a side elevational view of a module assembly 520 including a release mechanism 522 similar to the release mechanism 452 shown in FIGS. 16 and 17, but including a spring element 524 which biases the actuator arms 454 to a latched position in the retention cavities in the direction of arrow L. In the illustrated embodiment, the spring element 524 is a leaf spring element, although it is appreciated that other biasing elements may be employed in alternative embodiments. The spring element 524 serves both the retain the actuator arms 454 is position once latched to latching elements 196 of a receptacle assembly 104 and also to return the actuator arms 454 to the latched position within the retention cavities 456 once the module assembly 520 is removed from a receptacle assembly.

While the invention has been described in terms of various specific embodiments, those skilled in the art will recognize that the invention can be practiced with modification within the spirit and scope of the claims.

What is claimed is:

1. An electrical module assembly configured for latching engagement with a receptacle assembly adapted for mounting to a printed circuit board, said electrical module assembly comprising:

a release mechanism comprising at least one actuator arm adapted to extend longitudinally along a respective one of opposite side walls of the receptacle assembly, said actuator arm comprising an ejector tab extending longitudinally therewith; and a pivotally mounted bail selectively positonable between a latched position and an unlatched position, said bail engaging said actuator arm when moved to said unlatched position and longitudinally pulling said actuator arm to release said ejector tab from the receptacle assembly.

2. An electrical module assembly in accordance with claim 1, said at least one actuator arm comprising a tapered leading end adjacent said ejector tab and inclined toward said ejector tab, said ejector tab comprising a ramped surface oppositely inclined to said tapered leading end.

3. An electrical module assembly in accordance with claim 1, said at least one actuator arm comprising an engagement surface, said bail separated from said engagement surface when in said latched position, said bail contacting said engagement surface when in said unlatched position.

4. An electrical module assembly in accordance with claim 1, said at least one actuator arm comprising an engagement surface extending transverse to a longitudinal axis through said actuator arm.

5. An electrical module assembly in accordance with claim 1 wherein said actuator arm comprises a slot and said bail comprises a ledge, said ledge extending into said slot and engaging said arm as said bail is rotated.

6. An electrical module assembly in accordance with claim 1 wherein said bail comprises a wire element.

7. An electrical module assembly in accordance with claim 1 wherein said at least one actuator arm comprises a longitudinally extending main body, an ejection tab extending longitudinally from said body, and a foot portion extending laterally from said body, said bail hooking over said foot portion and pulling said actuator arm as said bail is rotated.

8. An electrical module assembly in accordance with claim 1 wherein said actuator arm includes a raised surface, said bail contacting said raised surface as said bail is rotated, thereby flexing said bail and permitting longitudinal movement of said actuator arm to release said module assembly.

9. An electrical module assembly configured for latching engagement with a receptacle assembly adapted for mounting to a printed circuit board, said electrical module assembly comprising:

first and second side walls, each of said first and second side walls including a retention cavity, each of said first and second side walls configured for slidable insertion into a guide frame of the receptacle assembly;

a release mechanism comprising first and second actuator arms adapted to extend longitudinally adjacent a respective one of opposite side walls of the guide frame, each of said arms comprising an ejector tab extending longitudinally therewith and configured to deflect a latch tab formed in each of the side walls of the guide frame; and a pivotally mounted bail coupled to said module assembly, said bail configured to engage said actuator arms and displace said actuator arms along a longitudinal axis of said module assembly when said actuator is moved from a latched position to an unlatched position, said bail disengaged from said actuator arms when said bail is in said latched position.

10. An electrical module assembly in accordance with claim 9 wherein at least one of said actuator arms comprises a foot portion and a slot adjacent said foot portion, a portion of said bail extending into said slot and engaging said actuator arm when said bail is rotated to said unlatched position.

11. An electrical module assembly in accordance with claim 9 wherein each of said actuator anus comprises a longitudinally extending main body, said ejection tab extending longitudinally from said body, and a foot portion extending laterally from said body.

12. An electrical module assembly in accordance with claim 9 wherein said bail is seated within a channel in said module assembly when in said latched position.

13. An electrical module assembly in accordance with claim 9 wherein each of actuator arms comprises a foot portion, and said bail hooks over said foot portion as said bail is rotated to said unlatched position.

14. An electrical module assembly comprising:

a receptacle assembly comprising a guide frame having a top wall, a bottom wall and opposite side walls, each of said side walls comprising a latch tab therein;

a transceiver module assembly configured for insertion into said guide frame, said transceiver module assembly comprising opposite side surfaces extending adjacent said side walls of said guide frame when said module assembly is inserted into said guide frame, each of said side surfaces of the module assembly comprising a retention cavity for engagement with a respective one of said latch tabs of said receptacle assembly;

a release mechanism comprising first and second substantially parallel actuator arms adapted for sliding engagement with said retention cavities of said module assembly, said actuator arms positionable longitudinally adjacent a respective one of side wails of the guide frame, each of said arms comprising an ejector tab extending longitudinally therewith and configured to deflect a respective one of said latch tabs of said guide frame; and a pivotally mounted bail coupled to said module assembly and configured to directly engage said actuator arms to unlatch said module assembly from said guide frame, said bail and said actuator arms configured to position said ejector tabs relative to said latch tabs to manually release said module assembly from said guide frame without the use of bias elements.

15. A module assembly in accordance with claim 14 wherein said bail comprises a wire formed element.

16. A module assembly in accordance with claim 14 wherein said bail is seated within a channel in said module assembly when in a latched position.

17. A module assembly in accordance with claim 14 wherein said bail comprises a pair of actuator hooks, each of hooks engaging one of said actuator arms to pull said module assembly from said guide frame.

* * * * *